United States Patent
Finschi

(10) Patent No.: US 9,592,994 B2
(45) Date of Patent: Mar. 14, 2017

(54) ENERGY MANAGEMENT FOR ELEVATOR SYSTEM WITH MULTIPLE CARS

(71) Applicant: Inventio AG, Hergiswil (CH)

(72) Inventor: Lukas Finschi, Ebikon (CH)

(73) Assignee: Inventio AG, Hergiswil (CH)

( * ) Notice: Subject to any disclaimer, the term of this patent is extended or adjusted under 35 U.S.C. 154(b) by 421 days.

(21) Appl. No.: 14/350,372

(22) PCT Filed: Oct. 5, 2012

(86) PCT No.: PCT/EP2012/069738
§ 371 (c)(1),
(2) Date: Apr. 8, 2014

(87) PCT Pub. No.: WO2013/053648
PCT Pub. Date: Apr. 18, 2013

(65) Prior Publication Data
US 2014/0284145 A1   Sep. 25, 2014

(30) Foreign Application Priority Data

Oct. 14, 2011   (EP) .................................... 11185219

(51) Int. Cl.
  *B66B 1/20*   (2006.01)
  *B66B 1/46*   (2006.01)
  *B66B 1/24*   (2006.01)

(52) U.S. Cl.
  CPC ............ *B66B 1/468* (2013.01); *B66B 1/2458* (2013.01); *B66B 1/2466* (2013.01); *B66B 2201/103* (2013.01); *B66B 2201/211* (2013.01); *B66B 2201/213* (2013.01); *B66B 2201/216* (2013.01); *B66B 2201/222* (2013.01); *B66B 2201/306* (2013.01); *B66B 2201/401* (2013.01); *B66B 2201/402* (2013.01); *B66B 2201/403* (2013.01); *Y02B 50/122* (2013.01)

(58) Field of Classification Search
  CPC ..... B66B 1/468; B66B 1/2458; B66B 1/2466; B66B 2201/103; B66B 2201/211; B66B 2201/213; B66B 2201/216; B66B 2201/222; B66B 2201/306; B66B 2201/401; B66B 2201/402; B66B 2201/403; Y02B 50/122
  USPC ....... 187/247, 249, 281, 380–388, 391, 392, 187/393, 902
  See application file for complete search history.

(56) References Cited

U.S. PATENT DOCUMENTS 7,032,715 B2 *  4/2006  Smith .................... B66B 1/2458
                                        187/247
7,083,027 B2 *  8/2006  Siikonen ............... B66B 1/2458
                                        187/383
7,275,623 B2 * 10/2007  Tyni ...................... B66B 1/2408
                                        187/382

(Continued)

FOREIGN PATENT DOCUMENTS

WO    02066355 A2    8/2002
WO    02066356 A2    8/2002

*Primary Examiner* — Anthony Salata
(74) *Attorney, Agent, or Firm* — William J. Clemens; Fraser Clemens Martin & Miller LLC

(57) ABSTRACT

Elevator system passengers are transported in one or more of a plurality of elevator cars. The elevator cars can require different amounts of energy to operate. Passenger trips can be allocated to one car or another car based on the expected energy consumption for the trips in one or the other car.

10 Claims, 5 Drawing Sheets

(56) References Cited

U.S. PATENT DOCUMENTS

| | | | | |
|---|---|---|---|---|
| 7,416,057 B2* | 8/2008 | Kostka | ............... | B66B 1/18 187/382 |
| 7,510,054 B2* | 3/2009 | Bahjat | ............... | B66B 1/18 187/247 |
| 7,546,906 B2* | 6/2009 | Tyni | ............... | B66B 1/2458 187/247 |
| 7,610,995 B2* | 11/2009 | Ylinen | ............... | B66B 1/34 187/381 |
| 7,743,890 B2* | 6/2010 | Nikovski | ............... | B66B 1/2458 187/247 |
| 7,909,143 B2* | 3/2011 | Tyni | ............... | B66B 1/2458 187/247 |
| 8,104,585 B2* | 1/2012 | Smith | ............... | B66B 1/2458 187/247 |
| 8,602,172 B2* | 12/2013 | Suzuki | ............... | B66B 1/2458 187/382 |
| 9,016,440 B2* | 4/2015 | Finschi | ............... | B66B 1/2458 187/382 |
| 2005/0006183 A1 | 1/2005 | Smith et al. | | |
| 2015/0166301 A1* | 6/2015 | Sorsa | ............... | B66B 1/2458 187/388 |

* cited by examiner

ENERGY MANAGEMENT FOR ELEVATOR SYSTEM WITH MULTIPLE CARS

FIELD

The disclosure relates to energy consumption in elevator systems with multiple elevator cars.

BACKGROUND

Generally, there are many advantages to improving energy efficiency in buildings. Sometimes improved efficiency can be realized in an elevator system.

WO2010/086290A1 relates to a method for operating an elevator system, wherein the energy consumption of at least one energy consumer of the elevator system and at least one traffic situation of the elevator system are recorded. At least one energy consumption value is determined. When using an elevator system, a passenger can sometimes select from, for example, three possible elevator trips having different energy consumption values.

Further options for managing energy consumption in elevator systems could be advantageous. This is addressed herein by at least some of the embodiments described.

SUMMARY

In various embodiments, elevator system passengers are transported in one or more of a plurality of elevator cars. The elevator system has at least two different cars, which can require different amounts of energy to operate. Passenger trips can be allocated to one car or another based on the expected energy consumption for the trips in one or the other car.

At least some embodiments of an elevator operation method comprise: receiving elevator call information for one or more elevator trips; and allocating the one or more elevator trips for service among a first elevator car and a second elevator car, the allocating being based on expected energy consumption for the first elevator car and expected energy consumption for the second elevator car.

The method can further comprise: determining the expected energy consumption for at least one of the one or more elevator trips with the first elevator car; and determining the expected energy consumption for the at least one of the one or more elevator trips with the second elevator car.

The determining the expected energy consumption for the at least one of the one or more elevator trips with the first elevator car and the determining the expected energy consumption for the at least one of the one or more elevator trips with the second elevator car can comprise reading one or more settings from a computer-readable storage medium. The determining the expected energy consumption for the at least one of the one or more elevator trips with the first elevator car and the determining the expected energy consumption for the at least one of the one or more elevator trips with the second elevator car can also comprise using a model of operation of the first elevator car and a model of operation of the second elevator car.

The allocating can be further based on an expected elevator traffic demand. The allocating can also be based on a measured traffic demand. The allocating can also be based on an elevator traffic schedule.

In some embodiments, the elevator call information comprises destination call information.

Some embodiments of an elevator installation comprise: a first elevator car disposed in a first elevator shaft; a second elevator car disposed in a second elevator shaft; and an elevator control unit, the elevator control unit being configured to receive elevator call information for one or more elevator trips and allocate the one or more elevator trips for service among the first elevator car and the second elevator car, the allocating being based on expected energy consumption for the first elevator car and expected energy consumption for the second elevator car.

In further embodiments, the first elevator car is heavier than the second elevator car. The first elevator car can have a first interior finishing and the second elevator car can have a second interior finishing. In some cases, the first elevator car has a larger capacity than the second elevator car. Further, the first elevator car can be configured to run at a first speed and the second elevator car can be configured to run at a second speed. In some cases, the first elevator car comprises a double-deck car and the second elevator car comprises a single car.

In further embodiments, a computer-based elevator system control unit comprises a processor and one or more computer-readable storage media. The storage media store instructions that, when executed by the processor, cause the processor to receive elevator call information for one or more elevator trips and allocate the one or more elevator trips for service among the first elevator car and the second elevator car, the allocating being based on expected energy consumption for the first elevator car and expected energy consumption for the second elevator car.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more optical disks, volatile memory components (such as DRAM or SRAM), and/or nonvolatile memory components (such as hard drives, Flash RAM or ROM). The computer-readable storage media do not cover pure transitory signals. The methods disclosed herein are not performed solely in the human mind.

DESCRIPTION OF THE DRAWINGS

The disclosure refers to the following figures, in which.

DETAILED DESCRIPTION OF THE INVENTION

Figure 1:
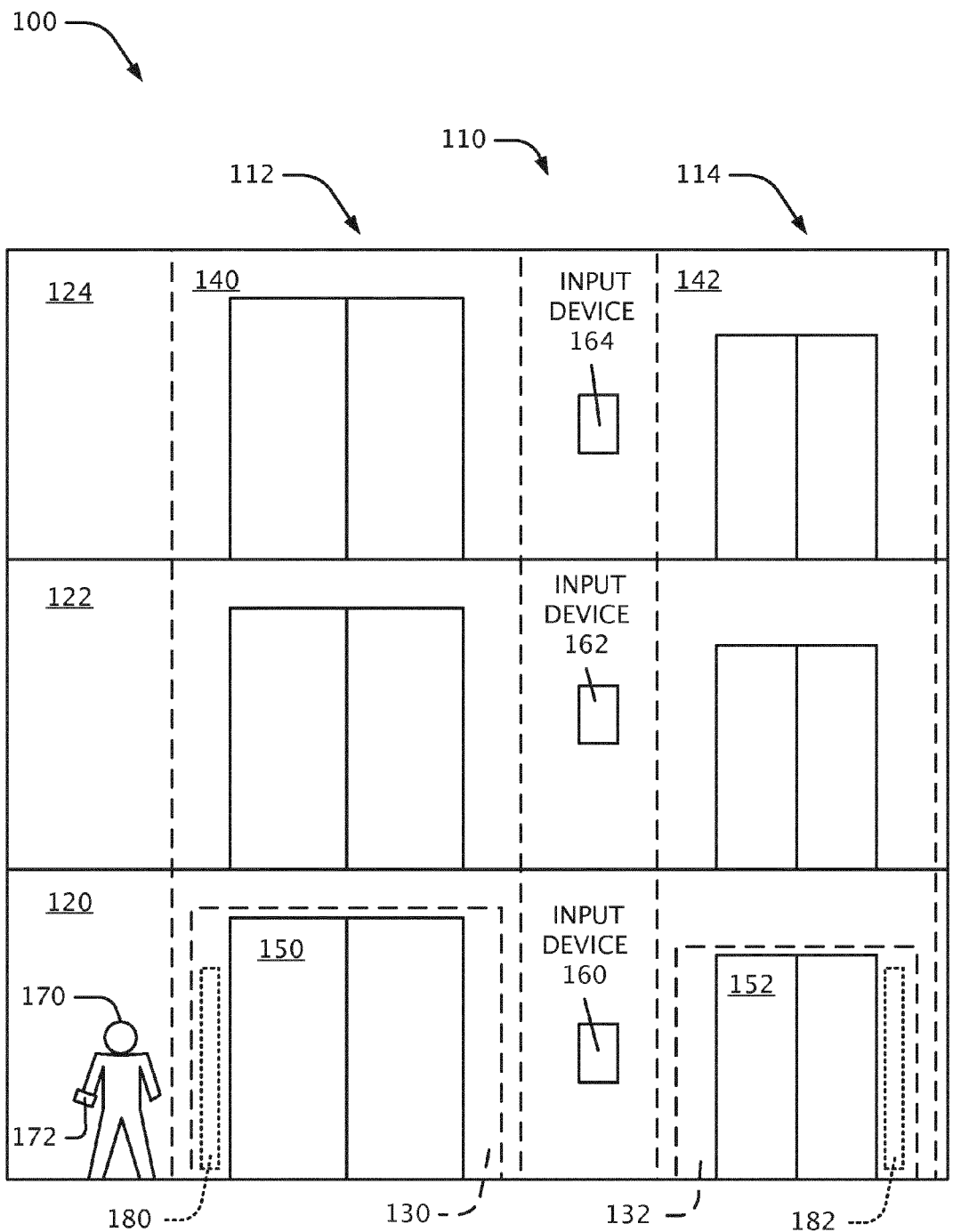
FIG. 1 is a block diagram of an exemplary embodiment of a building having an elevator installation.

FIG. 1 shows a block diagram of an exemplary embodiment of a building 100 having an elevator installation 110. The building 100 comprises a plurality of floors 120, 122, 124, which are served by the elevator installation 110. The installation 110 comprises elevators 112, 114. The elevator 112 comprises an elevator car 130 (shown in dashed outline) that moves within an elevator shaft 140 (shown in dashed outline) to reach the floors 120, 122, 124. The elevator 114 comprises an elevator car 132 (shown in dashed outline) that moves within an elevator shaft 142 (shown in dashed outline) to reach the floors 120, 122, 124. The cars 130, 132 can be moved within their respective shafts using various components, which (to improve clarity) are not shown in FIG. 1. Operation of the elevator installation 110 is controlled by a control unit (described in more detail below). The cars 130, 132 can be accessed at the floors 120, 122, 124 through doors, such as the doors 150, 152. The cars 130, 132 have respective interior finishings 180, 182 (shown in dashed outlines).

Although the elevators 112, 114 of FIG. 1 are shown as serving the same floors of the building 100, in some embodiments the elevators 112, 114 do not serve all of the same floors. In further embodiments, the elevator installation 110 comprises more than two elevators. In some cases, a given elevator shaft has more than two cars and/or a double deck car. In further cases, the installation 110 comprises a mixture of single cars and double-deck cars.

In the example of FIG. 1, the elevator cars 130, 132 are different sizes. (Further embodiments comprise cars of more than two different sizes.) The car 130 has a larger capacity than the car 132. In this context, "capacity" can refer to volume and/or weight of cargo that can travel in the cars 130, 132. The cargo can comprise, for example, human passengers, animals and/or inanimate objects. The car 130 is also heavier than the car 132; accordingly, the cars 130, 132 can require different amounts of energy to operate. In additional embodiments, the energy usage (also called "energy consumption") of the cars 130, 132 is affected by one or more factors aside from size, or in combination with size, for example: different car weights, due to different car finishings or other features; different operation speeds; and/or whether the cars are single cars or double-deck cars.

Generally, a first elevator car is considered to be "more efficient" than a second elevator car if the first car can execute a set of passenger trips using less energy than the second car. In this case the second elevator car is considered to be "less efficient."

Figure 2:
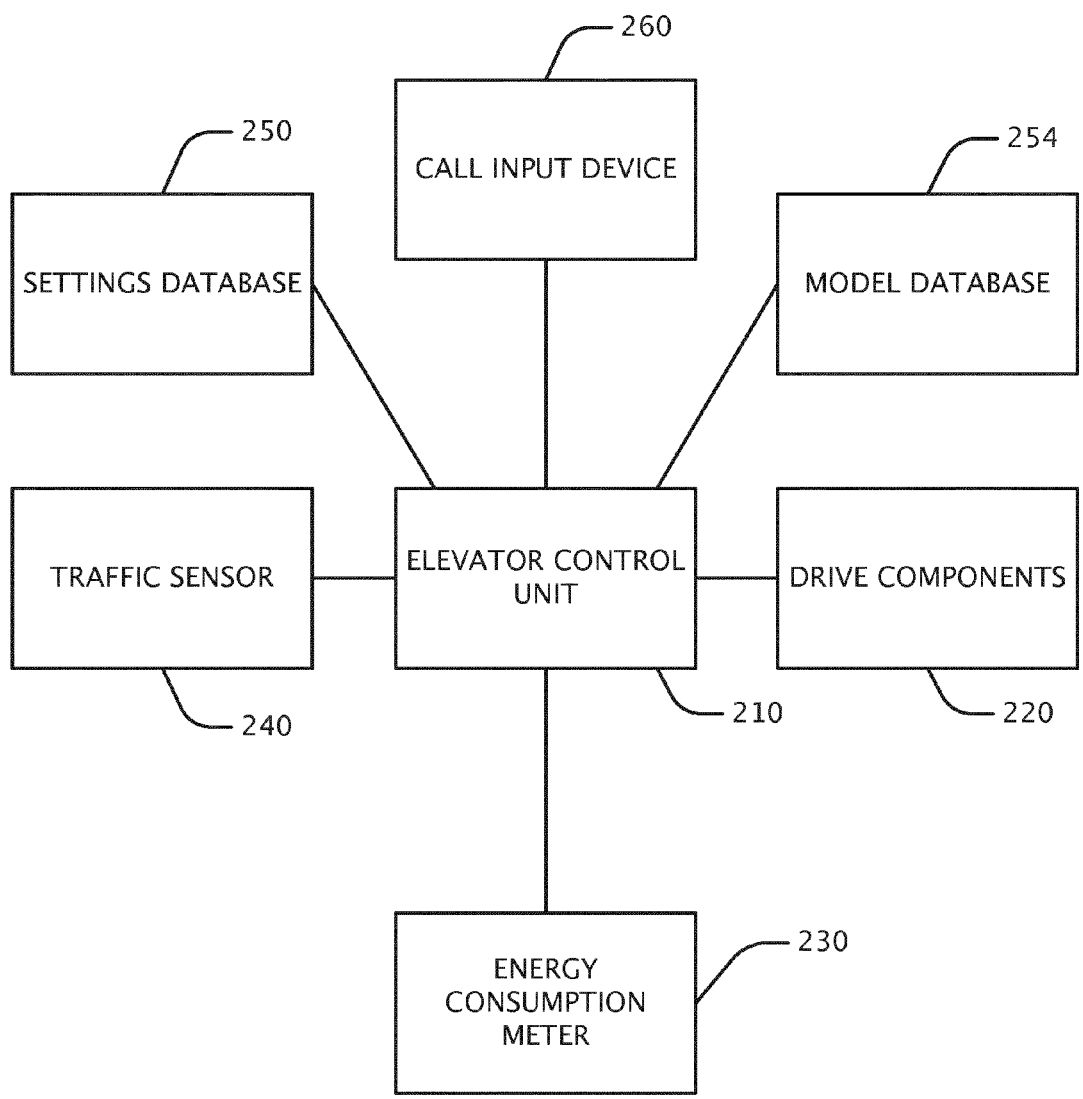
FIG. 2 is a block diagram of exemplary components of an elevator system.

FIG. 2 shows a block diagram of exemplary components of the elevator system 110. An elevator control unit 210 operates one or more drive components 220 (e.g., motors) to move elevator cars within their respective shafts. The control unit 210 is coupled to one or more call input devices 260. Turning briefly to FIG. 1, destination call input devices 160, 162, 164 are arranged on the floors 120, 122, 124, respectively. Generally, destination-call-input technology allows a destination for a user 170 (also referred to herein as a "passenger") to be input or determined before the user 170 enters the car 130. Such technology is sometimes referred to as "destination call control." In some cases, a data storage device 172 (e.g.: an RFID (radio-frequency identification) card, including near-field and far-field devices; magnetic storage device (e.g., magnetic strip card); optical code device) is used to transmit to the elevator installation 110 identifying information associated with the user 170. The identifying information can be transmitted to the elevator installation 110 through the input devices 160, 162, 164. Based on the identifying information, the control unit 210 determines a destination for the user 170. The control unit 210 assigns the user 170 to a particular elevator car and communicates this assignment to the user 170. The control unit 210 directs the car 130, 132 to carry the user 170 to the destination. In further embodiments, the user 170 (identified or unidentified) can input a destination using buttons and/or other features at the destination call input device 160, 162, 164.

The call input device 160, 162, 164 can comprise a stationary or semi-stationary device, or it can comprise a portable electronic device (e.g., a mobile telephone, a portable computer, a personal digital assistant (PDA), or other device).

Further embodiments of disclosed technologies, described below, can be used with elevator systems that do not use destination-call-control technology. Such systems include, for example, elevator systems that allow a user to place a hall call and to input a destination from inside the elevator car (e.g., using a car operating panel).

Although the user 170 is depicted in FIG. 1 and elsewhere herein as being a person, in various embodiments the user 170 can also be multiple people, a machine, an animal, a good and/or another object for transportation with the elevator installation.

Returning to FIG. 2, the elevator control unit 210 can also be coupled to an energy consumption meter 230. The meter 230 measures energy usage of one or more components of the installation 110. The control unit 210 can be further coupled to a traffic sensor 240, which measures elevator traffic handled by the installation 110. The control unit 210 can also be coupled to a model database 254, which stores models that describe the operation of the installation 110, and to a settings database 250, which stores information (e.g., pre-defined information) about the energy consumption of the installation 110.

Generally, functionality of the various components of FIG. 2 can be combined into one or more components split among additional components. For example, in some embodiments the traffic sensor 240 can be incorporated into the elevator control 210.

Figure 3:
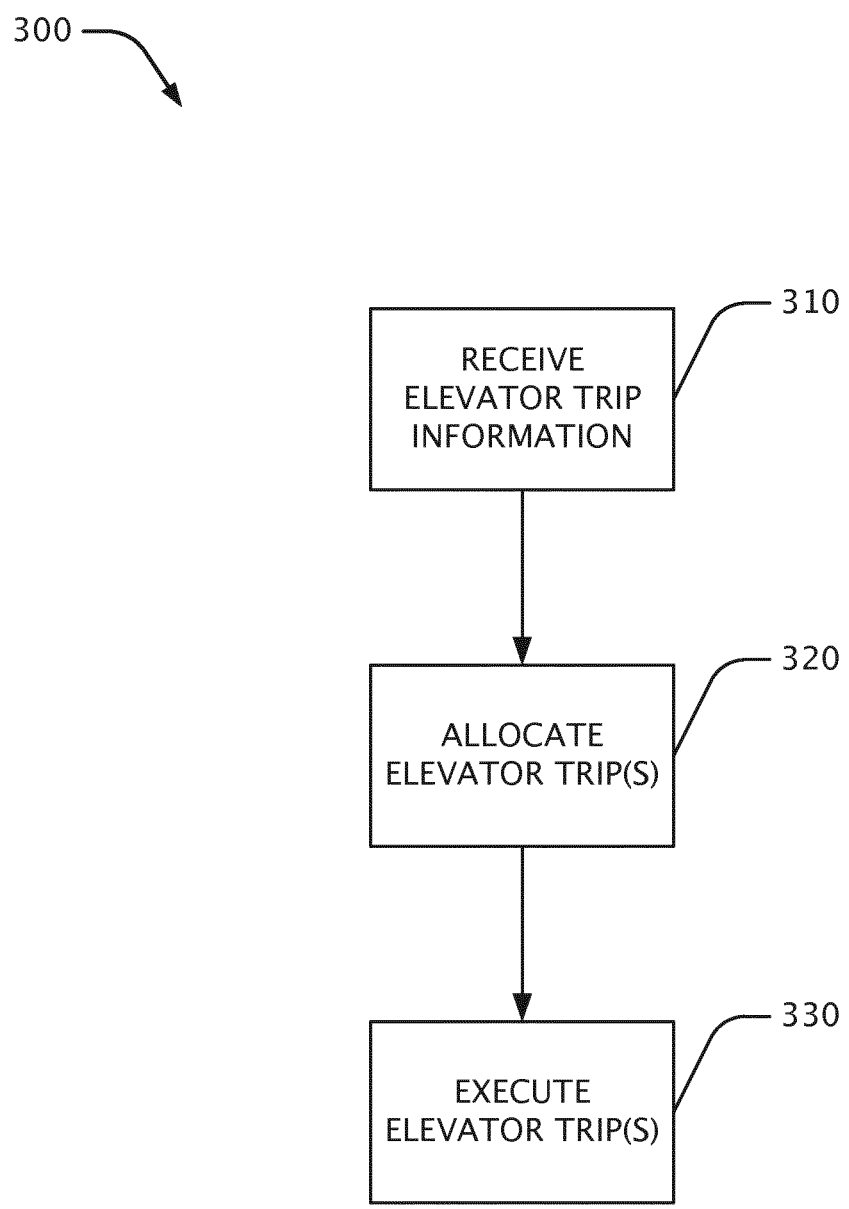
FIG. 3 is a block diagram of an exemplary embodiment of a method for operating an elevator installation.

FIG. 3 shows a block diagram of an exemplary embodiment of a method 300 for operating an elevator installation, such as the installation 110 of FIG. 1. In a method act 310, the elevator system 110 receives elevator trip information for the user 170 through an input device (e.g.: a destination call input device 160, 162, 164; an RFID scanner; an optical code scanner; a hall-call panel). As used herein, the elevator trip information describes one or more elevator trips. It includes one or more of a start floor, a destination floor, a destination name (e.g., "Lobby," "Cafeteria," "Office"), a tenant identifier (e.g., a tenant name), and user identifying information (e.g., a user name or a number associated with a user).

In a method act 320, the elevator system 110 allocates the one or more elevator trips to the elevator cars based at least in part on expected energy consumptions of the different elevator cars for the one or more elevator trips. This can be done using one or more rules. For example, the elevator system can be configured such that, if a small number of passengers are traveling together to a destination, the system uses a smaller elevator car that consumes a smaller amount of energy. The system can also be configured such that, if a large number of passengers are traveling together, the system uses a larger elevator car that consumes a larger amount of energy for movement of the car itself (but which consumes a lower amount of energy overall for transporting the larger number of passengers). Other factors used in assigning a trip to an elevator car include, for example, passenger preferences (e.g., VIP or disabled status), maximum number of stops, and/or maximum wait time. These other factors can be weighted more heavily or less heavily than the energy usage. The allocation of the method act 320 can be done in conjunction with one or more known elevator traffic allocation algorithms.

In a method act 330, the elevator system 110 executes one or more of the allocated elevator trips (e.g., the system communicates an elevator car assignment to the passenger and transports the passenger).

Figure 4:
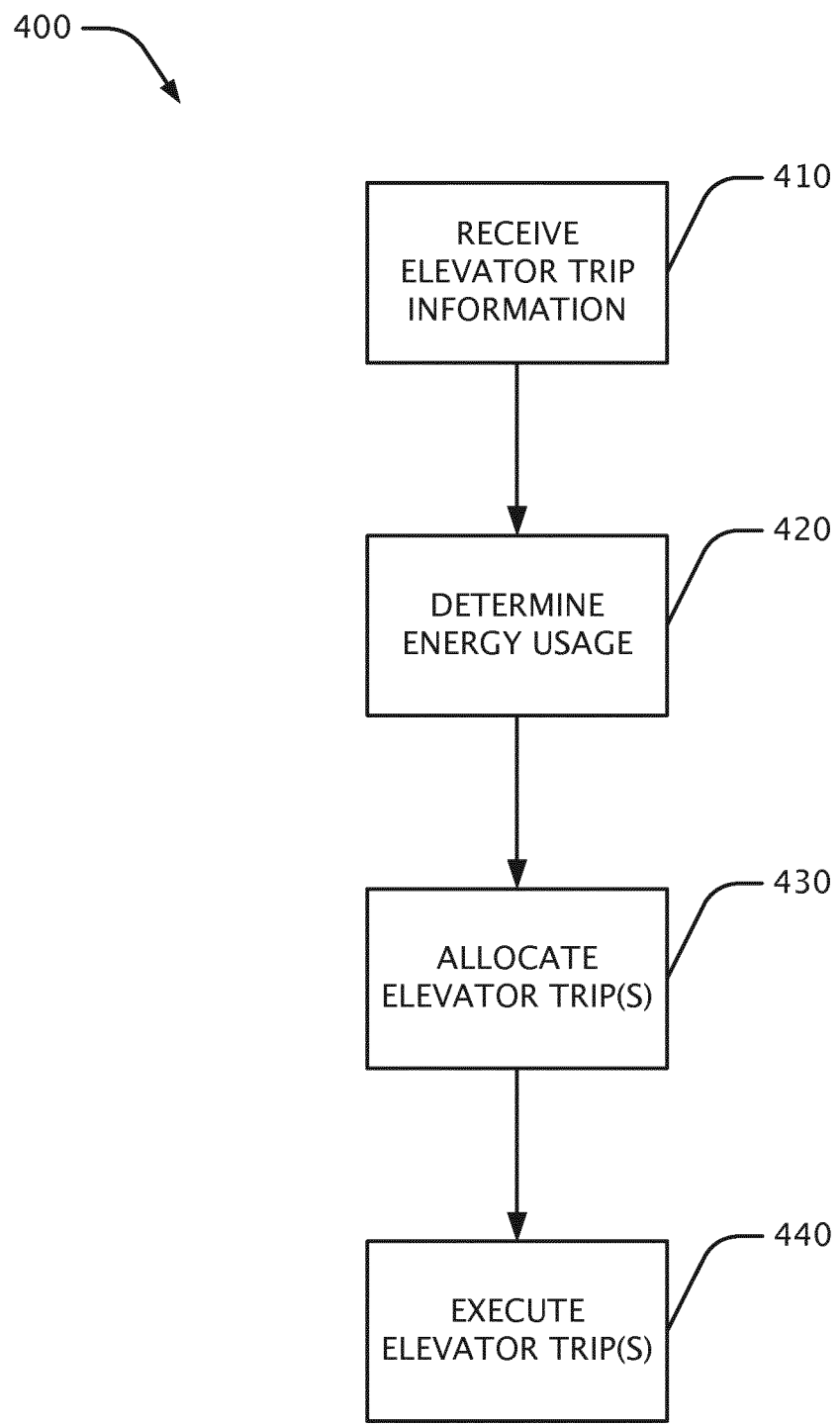
FIG. 4 is a block diagram of an exemplary embodiment of a method for operating an elevator installation.

FIG. 4 shows a block diagram of an exemplary embodiment of a method 400 for operating an elevator installation, such as the installation 110 of FIG. 1. In a method act 410, the elevator system 110 receives elevator trip information for the user 170 through an input device (e.g.: a destination call input device 160, 162, 164; an RFID scanner; an optical code scanner; a hall-call panel).

In a method act 420, energy usage for one or more possible elevator trips in the different cars is determined. The energy usage can be determined in one or more ways, depending on the particular embodiment.

In some cases, the expected energy usage is determined based on the size and/or type of the car. Such information can be stored in the elevator system (e.g., in the settings database 250). Traffic information can also be used. For example, if the system is receiving a relatively small number of calls (e.g., destination calls, hall calls, car calls), these conditions can suggest that elevator traffic is currently low. Actual car load can also be considered. In such cases, the more-efficient car can be, for example, a lighter but smaller-capacity car (instead of a heavier, larger-capacity car), or a single car (instead of a double-deck car). If the elevator traffic is determined to currently be above a threshold value, then other cars can be used (e.g., a heavier, larger-capacity car, or a double-deck car). In some embodiments, a trip can be allocated to a more-efficient car if that car is idle.

In further embodiments, the energy use of a car for a given trip can be calculated based on a model of the car's operation. The model considers factors such as expected trip direction, expected trip distance and/or elevator car load.

In a method act 430, the elevator system 110 allocates the one or more elevator trips to the elevator cars based at least in part on the determined ("expected") energy usage. In particular embodiments, the allocation of the elevator trips is also based in part on one or more other requirements for the trips. For example, the passenger may require a car with particular features (e.g., VIP features, handicapped features). These other requirements can take a higher or lower priority than the determined energy usage.

In a method act 440, the elevator system 110 executes one or more of the allocated elevator trips.

Following are four non-limiting examples of embodiments of the disclosed methods.

In the first example, a user enters the ground floor of a building and enters a destination call at the elevator system to travel to the second floor of the building. The elevator system comprises two larger elevator cars and two smaller elevator cars. At the time, there are no other passengers who have entered trip information to travel upward from the ground floor, so the passenger will be traveling alone. For a single passenger, the elevator system determines that it is more energy efficient to allocate the trip to a smaller elevator car. The elevator system directs the passenger to the smaller car and brings the passenger to the second floor.

In the second example, multiple passengers (e.g., ten people) enter destination calls to travel simultaneously from the ground floor of a building to the fourth floor. As with the previous example, the elevator system comprises two larger elevator cars and two smaller elevator cars. In this case, a maximum passenger limit for a smaller elevator car is seven persons, while the limit for a larger car is twelve persons. Thus, to simultaneously transport all ten passengers, the system can either use two smaller cars or one larger car. Using the single larger car would consume less energy overall, so the elevator installation allocates the trips for all of the passengers to the larger car.

In the third example, a relatively large number of passengers enter destination calls to travel from the second floor of the building to the third floor. Due to the large number of passengers, the elevator system assigns the passengers to all available cars, regardless of the expected energy usages for the cars.

In the fourth example, the elevator installation receives destination call information for three passengers who want to make the same trip. Based on a model of the elevator system, the system determines that assigning all of the passengers to the same elevator car would consume the least amount of energy. However, one passenger is designated as a VIP, who is always allotted a car for a solo trip. The system is configured to give a VIP setting priority over lower-energy consumption. As a result, instead of placing all three passengers in the same car, the system assigns the VIP passenger to one car and the other passengers to another car.

In further embodiments of any of the methods disclosed herein, the process of allocating of an elevator trip based on expected energy usage is enabled or disabled based on a time schedule. For example, during a busy period (e.g., rush hour) the elevator trips can be assigned to cars regardless of relative energy efficiencies of the different car sizes. This may be advantageous if, for example, parameters besides energy usage (e.g., wait time, travel time) have priority during the busy period.

In further embodiments of any of the methods disclosed herein, the process of allocating an elevator trip based on expected energy usage is manually enabled or disabled.

In various embodiments, one or more method acts are performed by the elevator control unit 210. In further embodiments, one or more method acts are performed by one or more other computer-based components.

Generally speaking, at least some of the disclosed embodiments allow for more flexible management of energy consumption in an elevator installation. At least some of the disclosed embodiments can also reduce energy consumption in an elevator installation.

Although some embodiments of the various methods disclosed herein are described as comprising a certain number of method acts, further embodiments of a given method can comprise more or fewer method acts than are explicitly disclosed herein. In additional embodiments, method acts are performed in an order other than disclosed herein.

Figure 5:
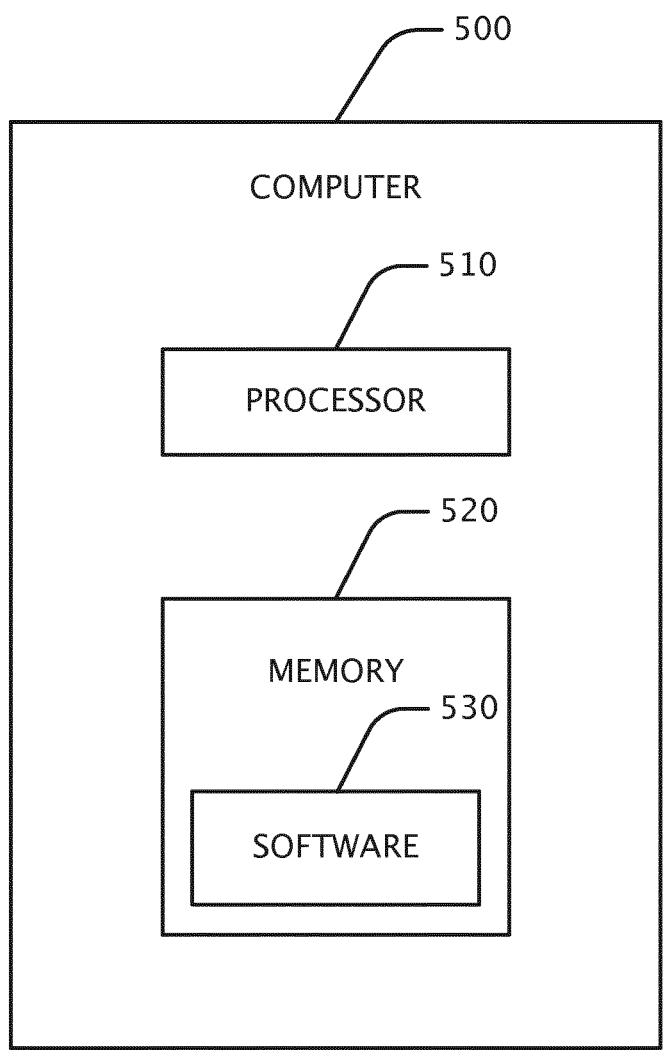
FIG. 5 is a block diagram of an exemplary embodiment of a computer.

FIG. 5 shows a block diagram of an exemplary embodiment of a computer 500 (e.g., part of an elevator control unit) that can be used with one or more technologies disclosed herein. The computer 500 comprises one or more processors 510. The processor 510 is coupled to a memory 520, which comprises one or more computer-readable storage media storing software instructions 530. When executed by the processor 510, the software instructions 530 cause the processor 510 to perform one or more method acts disclosed herein. Further embodiments of the computer 500 can comprise one or more additional components. The computer 500 can be connected to one or more other computers or electronic devices through a network (not shown). In particular embodiments, the computer 500 works with one or more other computers, which are located locally and/or remotely. One or more of the disclosed methods can thus be performed using a distributed computing system.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator operation method comprising:
   receiving elevator call information for one or more elevator trips;
   allocating the one or more elevator trips for service among a first elevator car and a second elevator car, the allocating being based on expected energy consumption for the first elevator car and expected energy consumption for the second elevator car, the expected energy consumption for the first elevator car being based on a weight of the first elevator car or a passenger capacity of the first elevator car, and the expected energy consumption for the second elevator car being based on a weight of the second elevator car or a passenger capacity of the second elevator car; and
   operating the first and second elevator cars according to the allocation of the one or more elevator trips;
   wherein:
      the expected energy consumption for the first elevator car is based on the weight of the first elevator car, the expected energy consumption for the second elevator car is based on the weight of the second elevator car, and the first elevator car is heavier than the second elevator car, or
      the expected energy consumption for the first elevator car is based on the passenger capacity of the first elevator car, the expected energy consumption for the second elevator car is based on the passenger capacity of the second elevator car, and the first elevator car has a larger passenger capacity than the second elevator car.

2. The elevator operation method according to claim 1 further comprising:
   determining the expected energy consumption for at least one of the one or more elevator trips with the first elevator car; and
   determining the expected energy consumption for the at least one of the one or more elevator trips with the second elevator car.

3. The elevator operation method according to claim 2 including the determining the expected energy consumption for the at least one of the one or more elevator trips with the first elevator car and the determining the expected energy consumption for the at least one of the one or more elevator trips with the second elevator car comprising using a model of operation of the first elevator car and a model of operation of the second elevator car.

4. The elevator operation method according to claim 1 including the allocating being further based on an expected elevator traffic demand.

5. The elevator operation method according to claim 1 including the allocating being further based on a measured traffic demand.

6. The elevator operation method according to claim 1 including the allocating being further based on an elevator traffic schedule.

7. The elevator operation method according to claim 1 including the elevator call information comprising destination call information.

8. An elevator installation comprising:
   a first elevator car disposed in a first elevator shaft;
   a second elevator car disposed in a second elevator shaft; and
   an elevator control unit, the elevator control unit being configured to receive elevator call information for one or more elevator trips, and to allocate the one or more elevator trips for service among the first elevator car and the second elevator car, the allocating being based on expected energy consumption for the first elevator car and on expected energy consumption for the second elevator car, the expected energy consumption for the first elevator car being based a weight of the first elevator car or a capacity of the first elevator car, and the expected energy consumption for the second elevator car being based on a weight of the second elevator car or a capacity of the second elevator car;
   wherein the first elevator car is heavier than the second elevator car, the first elevator car has a larger capacity than the second elevator car, or the first elevator car comprises a double-deck car and the second elevator car comprises a single car.

9. The elevator installation according to claim 8 wherein the first elevator car is heavier than the second elevator car and the first elevator car has a first interior finishing and the second elevator car has a second interior finishing.

10. One or more computer-readable storage media having encoded thereon instructions which, when executed by a processor, cause the processor to perform a method, the method comprising:
    receiving elevator call information for one or more elevator trips; and
    allocating the one or more elevator trips for service among a first elevator car and a second elevator car, the allocating being based on expected energy consumption for the first elevator car and expected energy consumption for the second elevator car, the expected energy consumption for the first elevator car being based on a weight of the first elevator car or a passenger capacity of the first elevator car, and the expected energy consumption for the second elevator car being based on a weight of the second elevator car or a passenger capacity of the second elevator car;
    wherein the first elevator car is heavier than the second elevator car, the first elevator car has a larger capacity than the second elevator car, or the first elevator car comprises a double-deck car and the second elevator car comprises a single car.

* * * * *